US010731306B2

(12) United States Patent
Preston et al.

(10) Patent No.: US 10,731,306 B2
(45) Date of Patent: Aug. 4, 2020

(54) STREET MAINTENANCE SAWING TRAILER

(71) Applicant: Pacific Technical Equipment & Engineering Inc., Anaheim, CA (US)

(72) Inventors: Kirk Preston, Anaheim, CA (US); Darin Preston, Anaheim, CA (US)

(73) Assignee: Pacific Technical Equipment & Engineering Inc., Anaheim, CA (US)

( * ) Notice: Subject to any disclaimer, the term of this patent is extended or adjusted under 35 U.S.C. 154(b) by 224 days.

(21) Appl. No.: 15/951,537

(22) Filed: Apr. 12, 2018

(65) Prior Publication Data

US 2018/0298574 A1  Oct. 18, 2018

Related U.S. Application Data

(60) Provisional application No. 62/484,517, filed on Apr. 12, 2017.

(51) Int. Cl.
| | |
|---|---|
| *E01H 1/10* | (2006.01) |
| *E01H 3/02* | (2006.01) |
| *B28D 7/02* | (2006.01) |
| *B60P 3/06* | (2006.01) |
| *B23Q 11/00* | (2006.01) |
| *E01C 23/09* | (2006.01) |
| *B23D 59/00* | (2006.01) |

(52) U.S. Cl.
CPC ............ *E01H 1/103* (2013.01); *B28D 7/02* (2013.01); *E01H 3/02* (2013.01); *B23D 59/006* (2013.01); *B23Q 11/0046* (2013.01); *B60P 3/06* (2013.01); *B60P 3/064* (2013.01); *E01C 23/0933* (2013.01)

(58) Field of Classification Search
CPC .... B23D 59/006; B23Q 11/0046; B28D 7/02; B60P 3/06; B60P 3/064; E01C 23/0933; E01H 1/103; E01H 3/02
See application file for complete search history.

(56) References Cited

U.S. PATENT DOCUMENTS

| | | | | |
|---|---|---|---|---|
| 5,215,071 | A * | 6/1993 | Mertes ...................... | B27B 9/02 125/13.01 |
| 7,503,134 | B2 * | 3/2009 | Buckner ............... | E01H 1/0827 15/300.1 |
| 2006/0032095 | A1 * | 2/2006 | Buckner ............... | E02F 3/8816 37/304 |
| 2006/0185689 | A1 * | 8/2006 | Crocker .................... | B08B 3/02 134/10 |
| 2007/0207711 | A1 * | 9/2007 | Crocker ................. | E01H 1/103 451/67 |

* cited by examiner

*Primary Examiner* — Marc Carlson
(74) *Attorney, Agent, or Firm* — David L. Nocilly; Bond Schoeneck & King, PLLC

(57) ABSTRACT

A concrete saw trailing having a deck for receiving the saw and safely transporting the saw. The saw trailer additionally includes a vacuum excavation system having a vacuum tank for recovering debris from a worksite, a power washing system for cleaning operations, and a cooling water supply system for coupling to and supporting use of the concrete saw. A pair of split ramps permit access to the deck from the street side of the trailer, and two opposing saddle bag water tanks provide enough water for the use of vacuum excavation system, power washing system, and cooling water supply system.

11 Claims, 4 Drawing Sheets

STREET MAINTENANCE SAWING TRAILER

CROSS-REFERENCE TO RELATED APPLICATIONS

The present application claims priority to U.S. Provisional Application No. 62/484,517, filed on Apr. 12, 2017.

BACKGROUND OF THE INVENTION

1. Field of the Invention

The present invention relates to street maintenance vehicles and, more specifically, to a trailer for moving and supporting a concrete saw during street maintenance and sawing operations.

2. Description of the Related Art

Conventional concrete saw trailers are configured to transport a concrete saw and the water needed to cool the diamond blades. The trailers are frequently used by the government agencies and contractors that make repairs to road surfaces and other paved surfaces. Water is usually delivered to the saw by gravity feed from a water storage tank, but an optional pump can be installed to force feed water. While these trailers can transport a concrete saw, they do not allow transportation or integration of the rest of the equipment that is typically used at a worksite. In addition, conventional saw trailers do not include any mechanism for preparing a road surface prior to saw operations, or cleaning the slurry and other debris from the area after work is done.

BRIEF SUMMARY OF THE INVENTION

The present invention comprises a concrete saw trailing having a deck for receiving and safely transporting a saw, a water supply system for supporting the saw as well as a pressure washing system for roadside cleaning and a vacuum excavation system for cleanup operations. A split ramp system provides access to the deck from the street side of the trailer for even the heaviest concrete saws while being easily stowed or extended by a single user. Two opposing saddle bag water tanks provide enough water for the use of vacuum excavation system, power washing system, and cooling water supply system. For example, the present invention may be a street maintenance vehicle having a trailer frame extending from a hitch, a deck positioned on the trailer frame and dimensioned to store a concrete saw thereon, at least one ramp permitting access to the deck from a side of the trailer, a vacuum excavator tank and an associated vacuum source positioned on the trailer frame proximately to the deck, a source of water mounted to the trailer, a pressure washer operatively connected to the source of water, and a cooling system for the saw operatively connected to the same source of water as the pressure washer. The at least one ramp may be a pair of ramps pivotally mounted to the side of the trailer and moveable between an extended position, wherein the pair of ramps extend from the trailer and can contact a surface on which the trailer is positioned, and a stowed position, wherein the pair of ramps extend upwardly over the deck. The side of the trailer is preferably a street side of the trailer. The source of water may be a pair of water tanks. The deck may be located proximately to the hitch with the vacuum excavator tank is located distally. The pair of water tanks may be positioned with each of the pair of water tanks on an opposing side of the vacuum excavator tank. The trailer may have a pair of axles. A crackhead may be operatively connected to the trailer. A duckbill may be operatively connected to the trailer. A flood lamp may be mounted to a platform of the trailer. A traffic director may be mounted to the platform of the trailer.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
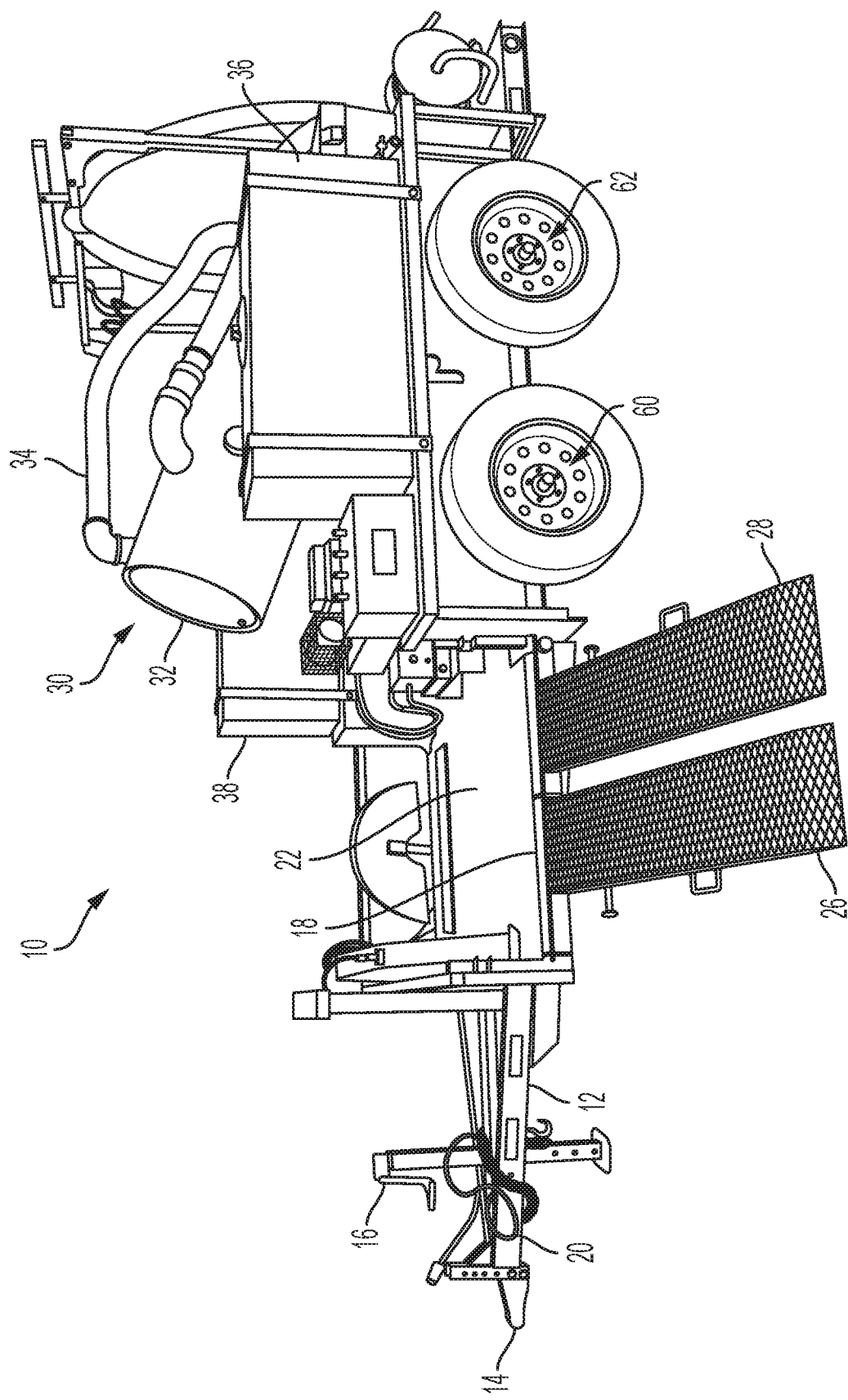
FIG. 1 is a side view of a saw trailer according to the present invention.
Figure 2:
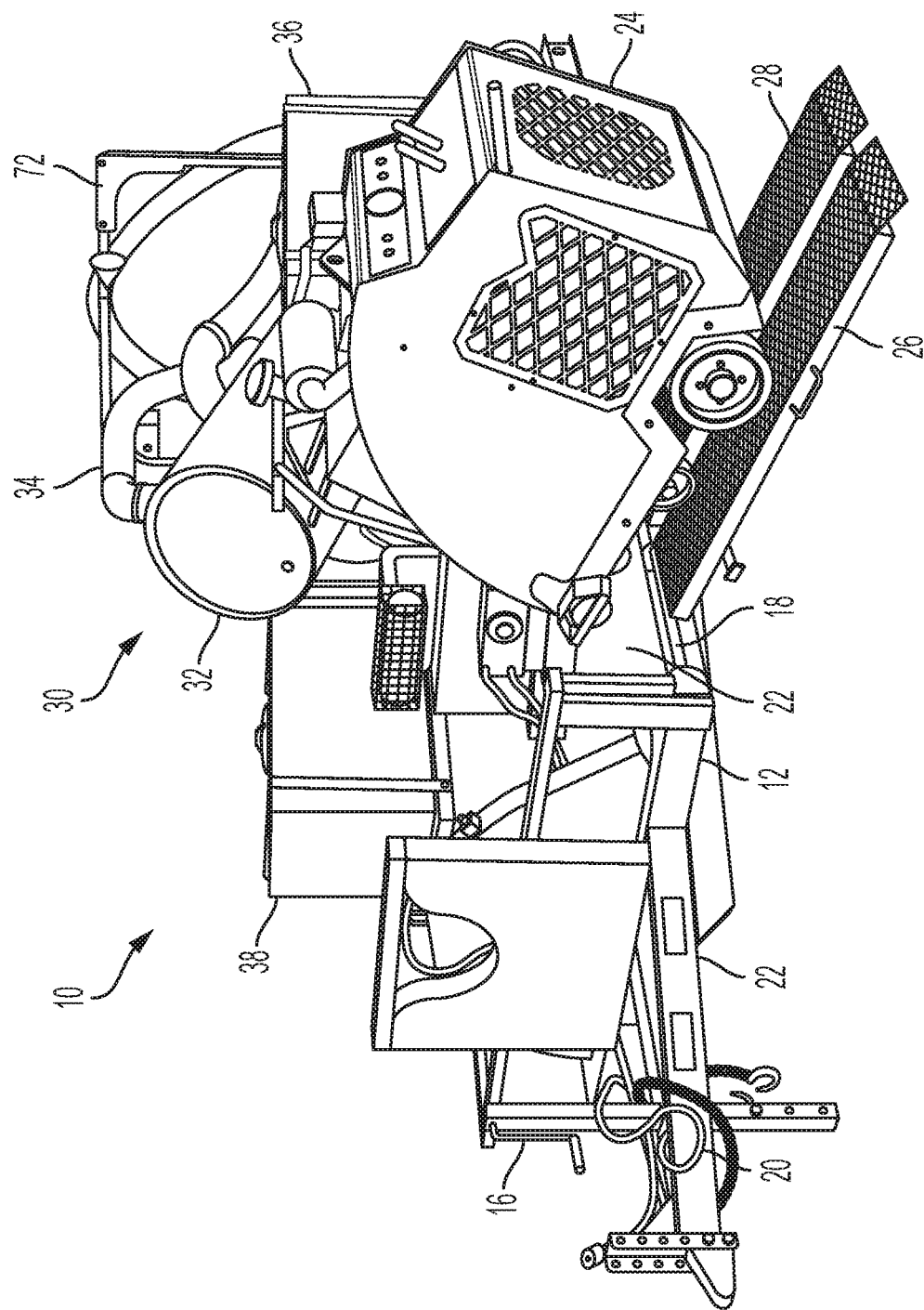
FIG. 2 is a perspective view of a saw trailer according to the present invention during loading of a street saw.
Figure 3:
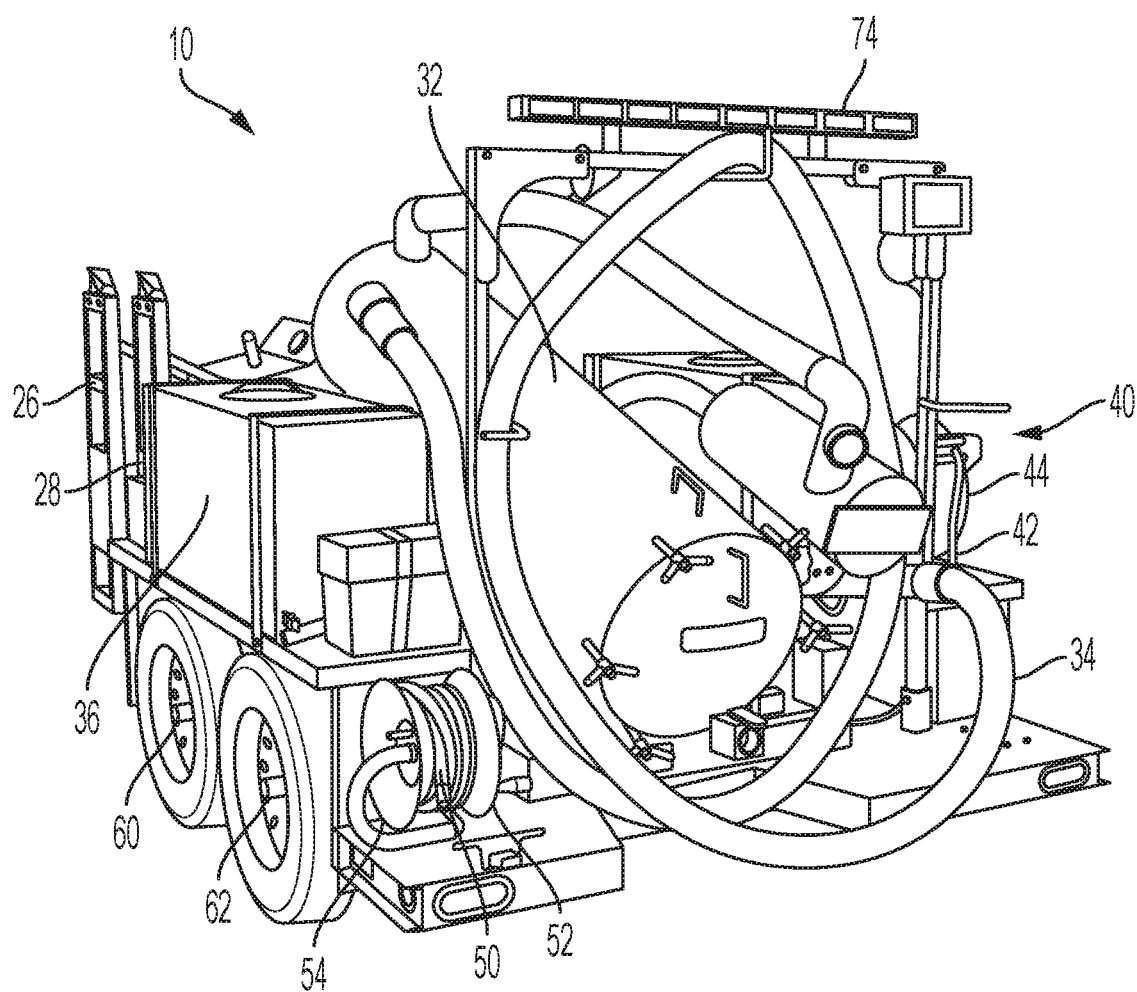
FIG. 3 is rear view of saw trailer according to the present invention.

Referring to the figures, wherein like numerals refer to like parts throughout, there is seen in FIG. 1 a saw trailer 10 according to the present invention. Saw trailer 10 comprises a trailer frame 12 extending from a hitch 14. Hitch 14 includes a pivotal trailer jack 16 having a hand crank 16 for raising and lowering hitch 14. Safety chains may be provided in the event that hitch 14 inadvertently disconnects from a towing vehicle (not shown). Hitch 14 further includes an electrical connector 20 for coupling to the electrical and braking system of the towing vehicle. Referring to FIG. 2, trailer frame 12 includes a deck 22 located proximately to hitch 14 that is dimensioned to receive a concrete saw 24. A pair of ramps 26 and 28 are pivotally coupled to frame 12 and moveable between a stowed position, where ramps 26 and 28 extend upwardly over frame 12, and an extended position, where ramps 26 and 28 extend outwardly from frame 12. Deck 22 preferably provides sufficient deck space on trailer frame 12 so that saw 24 may be driven up ramps and secured transversely across deck 22. Ramps 26 and 28 are preferably positioned on the street side of trailer 10, when legally parked, to avoid unloading of saw 24 onto lawns or gardens, but may be reversed for curb-side unloading if desired. Stops 18 may be incorporated into deck 22 to prevent inadvertent movement of saw 12 on deck 22 when trailer 10 is in motion. In the example of FIGS. 1-3, trailer 12 is eleven feet long and five and a half feet wide, and deck 22 is approximately three linear feet to accommodate saws of up to 64 inches by 43 inches. Ramps 26 and 28 are split to reduce overall weight to about 50 pounds each and must be sufficient to support concrete saw 24, which can range in overall weight from 100 pounds to one ton.

Trailer frame 12 additionally supports a vacuum excavation system 30 including a vacuum tank 32 and vacuum hoses 34 that may be extended from trailer 10 to remove debris from the road. Tank 32 is dimensioned to receive and store the slurry resulting from a full day of use of concrete saw 24. A pair of water tanks 36 and 38 are mounted on either side of vacuum excavation system 10 and interconnected to vacuum excavation system 30. Water tanks 36 and 38 supply water for a pressure washer system 40 having a pressure hose 42 and reel 44 mounted to a rear of trailer 12, as seen in FIG. 3. For example, a 3000 psi pressure washing system 40 may be adequate for street maintenance. Water tanks 36 and 38 additionally supply water to a cooling water system 50 having a cooling hose 52 and accompanying reel 54 to allow cooling hose 52 to be interconnected to concrete saw 24 to supply water to saw 24. Water tanks 36 and 38 are interconnected to a two gallon per minute, 35 psi water pump to assist with supplying water. Water tanks 36 and 38 are dimensioned to have enough water capacity for a typical work day associated with the use of concrete saw 24 and associated water systems described above and may comprise two 60 gallon saddle bag tanks. Trailer 12 is shown with dual axles 60 and 62 for supporting up to seven thousand pounds, such as when water tanks 36 and 38 and/or vacuum tank 32 are fully loaded.

Figure 4:
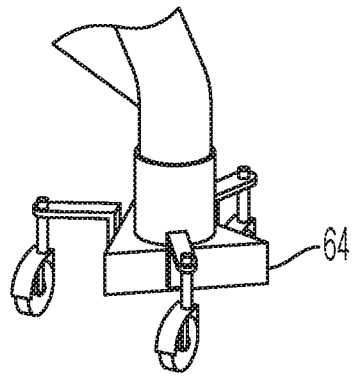
FIG. 4 is a perspective view of a crackhead attachment for a vacuum system of a saw trailer according to the present invention.
Figure 5:
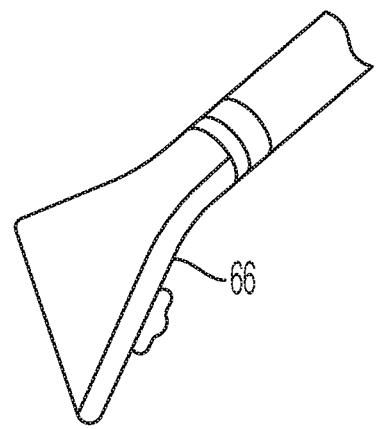
FIG. 5 is a perspective view of a duckbill attachment for a vacuum system of a saw trailer according to the present invention.
Figure 6:
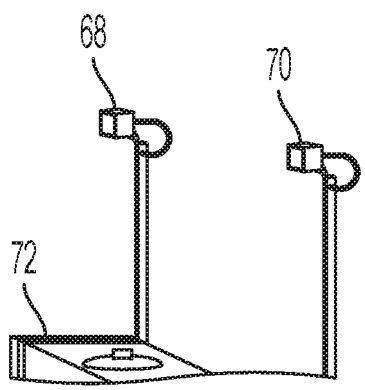
FIG. 6 is a perspective view of flood lamps for a saw trailer according to the present invention.

Referring to FIG. 4-5, saw trailer 10 may include attachments for vacuum excavation system 30, such as a crackhead 64 for removing debris from cracks in the surface of a road and a duckbill 66 street cleaning attachment that can pick up small debris and liquid from the pavement while leaving a damp trail on the ground. Referring to FIG. 6, two 2000 lumen flood lamps 68 and 70 may be mounted onto elevated platform 72 or on a LED traffic director, such as that seen in FIG. 3, and accompanied by curbside switch for nighttime operations.

What is claimed is:

1. A street maintenance vehicle, comprising:
a trailer frame extending from a hitch
a deck positioned on the trailer frame and dimensioned to store a concrete saw thereon;
at least one ramp permitting access to the deck from a side of the trailer;
a vacuum excavator tank and an associated vacuum source positioned on the trailer frame proximately to the deck;
a source of water mounted to the trailer;
a pressure washer operatively connected to the source of water; and
a cooling system for the saw operatively connected to the same source of water as the pressure washer.

2. The street maintenance vehicle of claim 1, wherein the at least one ramp comprises a pair of ramps pivotally mounted to the side of the trailer and moveable between a extended position, wherein the pair of ramps extend from the trailer and can contact a surface on which the trailer is positioned, and a stowed position, wherein the pair of ramps extend upwardly over the deck.

3. The street maintenance vehicle of claim 2, wherein the side of the trailer is a street side of the trailer.

4. The street maintenance vehicle of claim 3, wherein the source of water comprises a pair of water tanks.

5. The street maintenance vehicle of claim 4, wherein the deck is located proximately to the hitch and the vacuum excavator tank is located distally.

6. The street maintenance vehicle of claim 5, wherein the pair of water tanks are positioned with each of the pair of water tanks on an opposing side of the vacuum excavator tank.

7. The street maintenance vehicle of claim 6, wherein the trailer has a pair of axles.

8. The street maintenance vehicle of claim 7, further comprising a crackhead operatively connected to the trailer.

9. The street maintenance vehicle of claim 8, further comprising a duckbill operatively connected to the trailer.

10. The street maintenance vehicle of claim 9, further comprising a flood lamp mounted to a platform of the trailer.

11. The street maintenance vehicle of claim 10, further comprising a traffic director mounted to the platform of the trailer.

* * * * *